Figure 1:
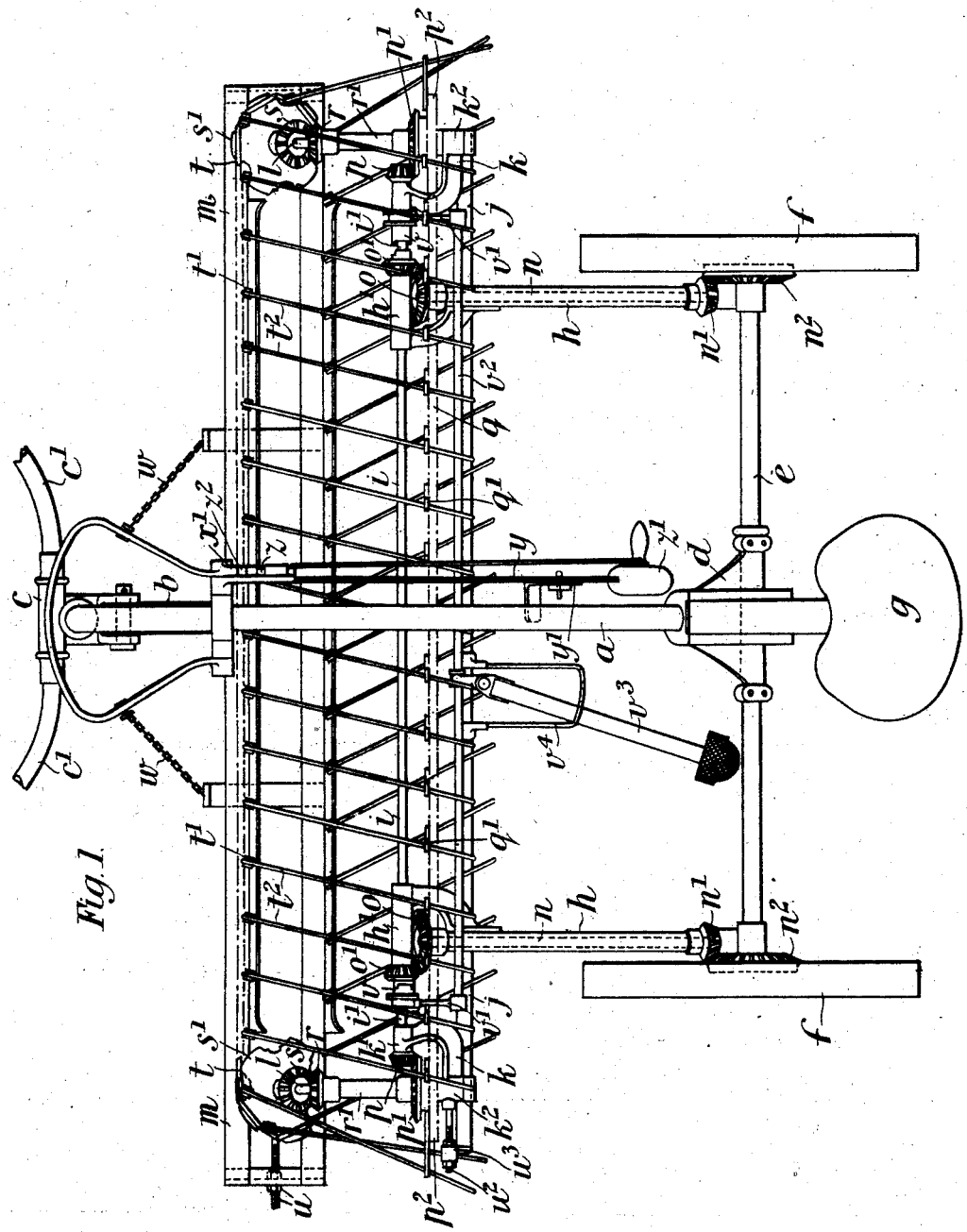

No. 866,326. PATENTED SEPT. 17, 1907.
E. C. BLACKSTONE & R. E. WATTS.
RAKE OR COLLECTOR FOR HAY AND OTHER CROPS.
APPLICATION FILED FEB. 23, 1907.

3 SHEETS—SHEET 1.

Witnesses.
Inventors

No. 866,326. PATENTED SEPT. 17, 1907.
E. C. BLACKSTONE & R. E. WATTS.
RAKE OR COLLECTOR FOR HAY AND OTHER CROPS.
APPLICATION FILED FEB. 23, 1907.
3 SHEETS—SHEET 2.
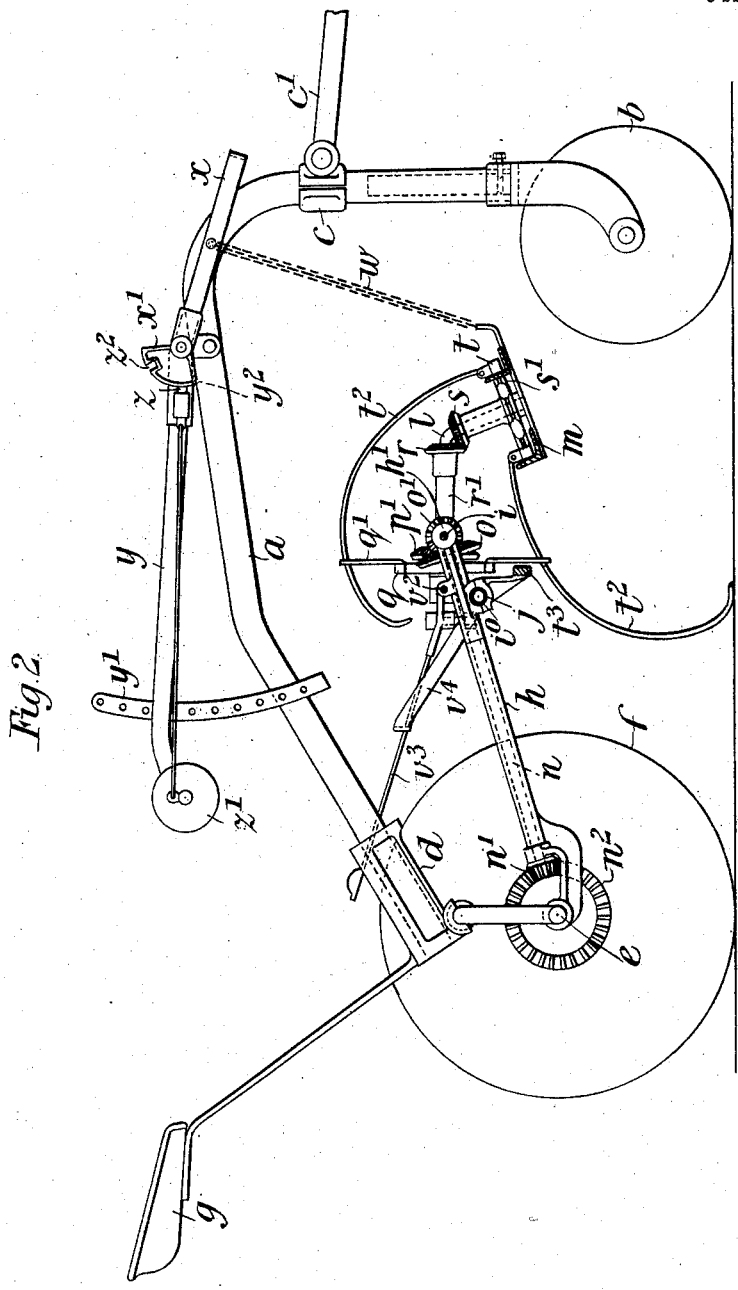

No. 866,326. PATENTED SEPT. 17, 1907.
E. C. BLACKSTONE & R. E. WATTS.
RAKE OR COLLECTOR FOR HAY AND OTHER CROPS.
APPLICATION FILED FEB. 23, 1907.
3 SHEETS—SHEET 3.
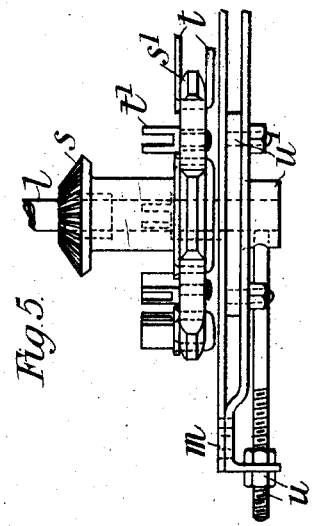
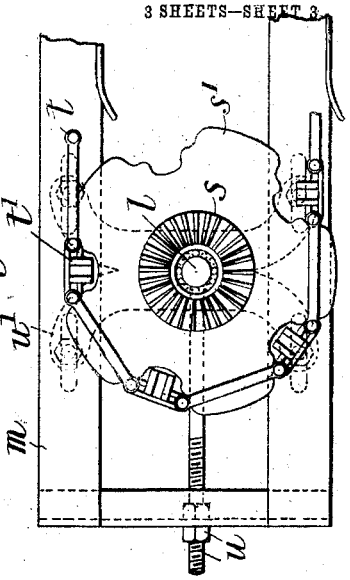
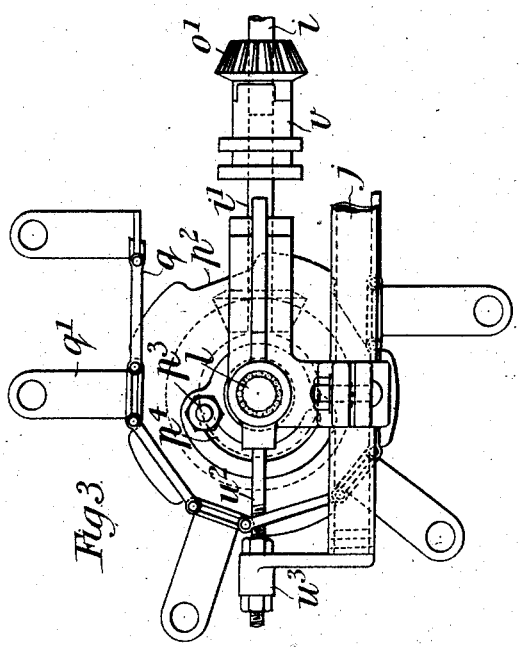
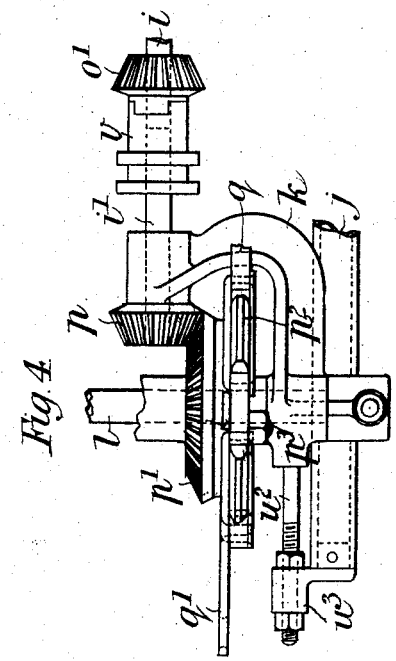
Witnesses.
Inventors

UNITED STATES PATENT OFFICE.

EDWARD CHRISTOPHER BLACKSTONE AND RICHARD EDWARD WATTS, OF STAMFORD, ENGLAND.

RAKE OR COLLECTOR FOR HAY AND OTHER CROPS.

No. 866,326.            Specification of Letters Patent.            Patented Sept. 17, 1907.

Application filed February 23, 1907. Serial No. 358,965.

*To all whom it may concern:*

Be it known that we, EDWARD CHRISTOPHER BLACKSTONE and RICHARD EDWARD WATTS, subjects of the King of Great Britain, residing at Rutland Engineering Works, Stamford, Lincolnshire, England, have invented new and useful Improvements in Rakes or Collectors for Hay and other Crops, of which the following is a specification.

Our invention relates to rakes or collectors designed for delivering the hay, or other material collected, at the side of the implement, the object of our invention being to provide an improved implement of this class by means of which the delivery may take place on either side of the machine.

In carrying out our invention we make use of two chains running over sprocket wheels one of which chains has a series of independent teeth or tines pivoted to it while the other chain carries a series of loops or stirrups through which the tines are passed and which serves to control the position of the said tines, that is to say, the two chains are arranged transversely of the frame of the implement and are adapted to be driven at the same speed through the medium of suitable gearing from the axle of the machine, the two sprocket wheels carrying each chain being at approximately the same distance from the ground. The chain to which the teeth are pivoted is arranged to lie in a more or less horizontal plane while the chain carrying the guiding stirrups is arranged in a more or less vertical plane.

To enable our invention to be fully understood we will describe the same by reference to the accompanying drawings, in which:—

Figure 1 is a plan view of the improved implement, and Fig. 2 is a side view of the same. Figs. 3 and 4 are respectively an elevation and a plan drawn to a larger scale than Figs. 1 and 2 of a portion of the driving mechanism, and Figs. 5 and 6 are respectively an edge view and a face view drawn to the same scale as Figs. 3 and 4, illustrating the arrangement for carrying the main driving chain. Fig. 7 is a sectional view illustrating the mounting of the teeth upon the driving chain.

The framing of the implement as shown comprises the longitudinally arranged tube $a$, the front end of which is bent to form a swan neck, and constitutes a socket in which a caster wheel $b$ is mounted, the said swan neck also having attached to it the bracket $c$ to which the draft shafts $c^1$ are attached, while the rear end of the said tube carries the bracket $d$ in which the main axle $e$ for the traveling wheels $f, f$ is mounted, the said bracket also carrying a driver's seat $g$. The framing also comprises two tubular brackets $h, h$ pivoted at their rear ends, upon the axle $e$ and at their front ends, carrying bearings $h^1, h^1$ for a counter-shaft $i$, sockets $i^0, i^0$, Fig. 2, beneath the tubular brackets $h, h$ carrying a cross tube $j$ to the ends of which angle brackets $k, k$ are clamped, the said brackets $k, k$ each being provided with a socket $k^1$ in which is a bearing for a loose extension $i^1$ of the counter-shaft $i$ and with another socket $k^2$ in which is fixed an angle spindle $l$ the two angle spindles carrying at their outer or forward ends a rectangular frame $m$ for supporting the main driving chain as hereinafter described.

In the tubular brackets $h, h$ are mounted the lay shafts $n, n$ which at their rear ends carry pinions $n^1, n^1$ engaging with bevel wheels $n^2, n^2$ fixed to the traveling wheels $f$, the said wheels $n^2$ having advantageously arranged in connection with them ratchet mechanism for permitting of the backing or turning of the implements.

The lay shafts $n, n$ at their front ends carry bevel wheels $o, o$ engaging with bevel pinions $o^1, o^1$ fixed to the ends of the counter-shaft $i$. The loose extension pieces $i^1, i^1$ of the counter-shaft $i$ carry on their outer ends bevel pinions $p, p$ which engage with bevel wheels $p^1, p^1$ secured to sprocket wheels $p^2, p^2$ mounted upon the upper portions of the angle spindles $l, l$ and carrying the chain $q$ upon which the guiding stirrups $q^1, q^1$ for the teeth are fixed.

The bevel wheels $p^1, p^1$ are united with pinions $r, r$ by means of sleeves $r^1, r^1$, the pinions $r, r$ engaging with other pinions $s, s$ connected to the sprocket wheels $s^1, s^1$ on the angle spindles $l, l$, the said sprocket wheels having upon them the chain $t$ carrying the joints $t^1, t^1$ to which the tines $t^2, t^2$ are pivoted. Each of the joints $t^1$ is vertically pivoted in a socket in the chain $t$, as shown in Fig. 7, and each tine passes through a guide stirrup $q^1$ in the chain $q$.

The driving chain $t$ which runs upon angle bars of the rectangular frame $m$, Figs. 1 and 2, is tightened by means of a screw and nut $u$, Figs. 1, 5 and 6, adapted to act on a bracket $u^1$ sliding in the rectangular frame $m$, the bracket being afterwards fixed in position by bolts passing through the said bracket and through slots in the said frame. The guide chain $q$ is tightened in a similar manner by a nut on a screw $u^2$ secured to the angle bracket $k$ and passing through a lug $u^3$ on the end of the stay tube $j$, Figs. 3 and 4.

$v, v$ are two clutches sliding on the extension pieces $i^1, i^1$ of the counter-shaft $i$ and adapted to engage with clutch teeth on the pinions $o^1, o^1$, the said clutches having engaging with them forks $v^1, v^1$ connected to a rod $v^2$ worked from the seat $g$ by the foot lever $v^3$. This foot lever is preferably made of spring steel and is adapted to engage with notches in a segment bar $v^4$ for the purpose of fixing the position of the said lever. When the lever is in engagement with the central notch the machine is out of gear, neither of the clutches $v$ being in engagement with its pinion. When, however, the lever $v^3$ is actuated by the pressure of the driver's foot and moved sidewise, the effect will be that one or the other of the said clutches will be caused to engage with its corresponding pinion and so drive the chains $q$ and $t$ in one or other direction. It will thus be seen that the rake may be set to deliver on either side according to requirements.

The tines $t^2$, $t^2$ which, as hereinbefore stated, are pivoted to the joints $t$, $t^1$ on the driving chain and pass through the stirrups $q^1$, $q^1$ are so guided by the latter that each tine is successively traversed from one side to the other of the implement in contact with the ground, then lifted from the ground, then moved across the machine in the reverse direction, and then again lowered on to the ground. The chains are preferably placed in such relation to one another that the tines which are on the ground will have their pivoted ends on the driving chain somewhat in advance of the rear portions thereof, so that the said tines will be at an angle to the longitudinal axis of the implement, that is to say, if the delivery is taking place at the left hand of the implement the tines will occupy the position shown in Fig. 1. With this arrangement, however, if it is desired to deliver on the opposite side of the implement the angle of the tines must be reversed. This can be accomplished by mounting the sprocket wheels $p^2$, $p^2$ carrying the guide chain adjustable relatively with the bevel wheels $p^1$, $p^1$ so as to allow of the guiding chain $q$ being moved a certain distance relatively with the driving chain $t$. As shown in Figs. 3 and 4 the bevel wheels $p^1$, $p^1$ are each provided with a stud $p^3$ which projects through a curved slot $p^4$ in the sprocket wheel $p^2$. When the machine is delivering on one side the said wheel is at one end of the slot, and when the gearing is changed to deliver on the opposite side the sprocket wheels carrying the guiding chain remain inoperative until the driving chain has pulled the teeth to the desired angle the stud in the meantime moving in the slot until it strikes the other end of the latter when the guiding chain again commences to move.

It will be understood that as the driving chain $t$ runs upon the angle bars of the frame $m$ it will be prevented from sagging under the weight of the material collected by the tines. It will also be seen that each tine is individually free to follow to a certain extent the inequalities of the ground, sufficient play being allowed in the eyes of the stirrups $q^1$, $q^1$ and furthermore the lower portion of the guiding chain is itself free to rise and fall, within certain limits. In order, however, to prevent too great a lifting of the tines a guide bar $t^3$ carried by the tube $j$ of the framing can be employed, see Fig. 2. The upper portion of the guiding chain $q$ may be kept from sagging unduly by running it over a roller or rollers, not shown, but which may be arranged for the purpose.

To provide for regulating the position of the teeth relatively with the ground I attach to the rectangular frame $m$ a suspension chain $w$, Fig. 2, which is connected to a lever $x$ pivoted upon the framing, the said lever having fixed to it a quadrant $x^1$. Upon the pivot of the lever $x$ I mount a hand lever $y$ which moves over a rack $y^1$ provided with a series of holes or otherwise constructed for enabling the said lever $y$ to be fixed in any position. A lug or projection $y^2$ upon the segment $x^1$ is retained in contact with the lever $y$ by the pull of the chain $w$.

In order to provide for lifting the tines clear of the ground when traveling, the lever $y$ which is loosely mounted relatively with the lever $x$ as hereinbefore stated, is lifted so that a spring catch $z$ operated by a semi-rotary handle $z^1$ may be caused to engage with a notch $z^2$ in the quadrant $x^1$ thereby allowing of moving the lever $x$ to a sufficient extent to lift the teeth.

When using our improved rake it is not necessary for instance, when collecting a light crop, that the tines should be continually moved by the chains as the said tines may be allowed to remain at rest and only be caused to traverse laterally when a desired amount of material has been collected.

Having now particularly described and ascertained the nature of our said invention and in what manner the same is to be performed, we declare that what we claim is:—

1. In a rake of the kind described, the combination with a main frame, of a pair of endless carriers mounted on said frame and movable transversely thereof in the same direction, a series of separate tines pivoted to one of said endless carriers, the other of said carriers being provided with a series of devices for engaging said tines, whereby as said tines are dragged by one of said endless carriers, they are guided into and out of operative position by the other of said endless carriers, substantially as described.

2. In a rake of the kind described, the combination with a main frame, of a pair of endless carriers mounted on said frame and movable transversely thereof in the same direction, a series of separate tines pivoted to one of said endless carriers, the other of said carriers being provided with a series of devices for engaging said tines, said carriers being so arranged relatively with one another as to carry the pivoted ends of said tines in advance of the operative ends thereof whereby one of said carriers drags said tines while the other of said carriers guides the free ends of said tines into and out of operative position, substantially as described.

3. In a rake of the kind described, the combination with a main frame, of a pair of endless carriers mounted on said frame and movable transversely thereof in the same direction, a series of separate tines pivoted to one of said endless carriers, the other of said carriers being provided with a series of devices for engaging said tines, said carriers being so arranged relatively with one another as to carry the pivoted ends of said tines in advance of the operative ends thereof, mechanism for reversing the direction of movement of said carriers, and means for shifting one of said carriers independently of the other to maintain the same relative position of said tines, substantially as described.

4. In a rake of the kind described, the combination with a main frame, of a pair of endless carriers mounted on said frame and movable transversely thereof in the same direction, one of said carriers being in an inclined plane and the other of said carriers being in a vertical plane, a series of separate tines pivoted to said inclined carrier, said vertically disposed carrier being provided with a series of stirrups, each of said series of tines passing through one of said series of stirrups on said carrier, substantially as described.

5. In a rake of the kind described, the combination with a frame mounted on traveling wheels, of a pair of endless carriers mounted on said frame and movable transversely thereof in the same direction, a series of separate tines pivoted to one of said carriers, each of said tines being also secured to the other of said carriers, mechanism for driving said carriers, mechanism for reversing the movement of said carriers and mechanism for automatically shifting one of said carriers independently of the other when the movement of said carriers is reversed so that the pivoted ends of said tines will be in advance of their operative ends, substantially as described.

EDWARD CHRISTOPHER BLACKSTONE.
RICHARD EDWARD WATTS.

Witnesses:
JOHN E. BOUSFIELD,
A. ALBUTT.